United States Patent
Wang

(10) Patent No.: US 6,753,995 B2
(45) Date of Patent: Jun. 22, 2004

(54) ELECTROCHROMIC MIRROR AND REFLECTIVE LAYER THEREOF

(75) Inventor: Fu-Shing Wang, Taoyuan (TW)

(73) Assignee: Exon Science, Inc. (TW)

( * ) Notice: Subject to any disclaimer, the term of this patent is extended or adjusted under 35 U.S.C. 154(b) by 0 days.

(21) Appl. No.: 10/388,730

(22) Filed: Mar. 7, 2003

(65) Prior Publication Data

US 2004/0051930 A1 Mar. 18, 2004

(30) Foreign Application Priority Data

Sep. 18, 2002 (TW) ........................................ 91121317 A

(51) Int. Cl.$^7$ .............................................. G02F 1/153
(52) U.S. Cl. ........................ 359/271; 359/265; 359/267
(58) Field of Search ................................. 359/265–275, 359/321, 322; 345/49, 105; 348/817

(56) References Cited

U.S. PATENT DOCUMENTS

| | | | |
|---|---|---|---|
| 4,712,879 A | 12/1987 | Lynam et al. | 359/275 |
| 4,852,979 A | 8/1989 | Agrawal | 359/274 |
| 5,076,674 A | 12/1991 | Lynam | 359/274 |
| 5,239,405 A | 8/1993 | Varaprasad et al. | 359/272 |
| 5,282,077 A | 1/1994 | Byker | 359/272 |
| 5,481,395 A | 1/1996 | Byker | 359/272 |
| 5,818,625 A | 10/1998 | Forgette et al. | 359/267 |
| 5,825,527 A | 10/1998 | Forgette et al. | 359/267 |
| 6,166,848 A | 12/2000 | Cammenga et al. | 359/267 |
| 6,178,034 B1 | 1/2001 | Allemand et al. | 359/265 |
| 6,195,193 B1 | 2/2001 | Anderson et al. | 359/265 |
| 6,441,943 B1 * | 8/2002 | Roberts et al. | 359/267 |
| 6,522,451 B1 * | 2/2003 | Lynam | 359/265 |
| 2002/0041424 A1 * | 4/2002 | Lynam | 359/275 |
| 2002/0041443 A1 | 4/2002 | Varaprasad et al. | 359/603 |

FOREIGN PATENT DOCUMENTS

| | | |
|---|---|---|
| EP | 0728618 A2 | 8/1996 |
| JP | 61133902 | 6/1986 |
| WO | WO-00/23826 | 2/2000 |
| WO | WO 01/06026 | 1/2001 |

* cited by examiner

Primary Examiner—Jordan M. Schwartz
Assistant Examiner—Jessica Stultz
(74) Attorney, Agent, or Firm—Madson & Metcalf

(57) ABSTRACT

An electrochromic mirror is provided for performing color change in response to a voltage applied thereto. The electrochromic mirror includes a first substrate, a second substrate, a first and a second electrodes, an electrochromic composition and a reflective layer. The reflective layer is made of aluminum-titanium (Al/Ti) alloy and disposed on the second substrate for partially reflecting the light entering from the first substrate back to the first substrate. A reflective layer of an electrochromic mirror for partially reflecting incident light from an image is also provided. The reflective layer includes an aluminum-titanium (Al/Ti) alloy layer and an indium tin oxide (ITO) attached to the aluminum-titanium (Al/Ti) alloy layer.

11 Claims, 4 Drawing Sheets

ELECTROCHROMIC MIRROR AND REFLECTIVE LAYER THEREOF

FIELD OF THE INVENTION

The present invention relates to an electrochromic mirror, and more particular to an electrochromic mirror having an alternative color and desired electrochromic property by incorporating therein a specific reflective layer. The present invention further relates to a reflective layer imparting an alternative color and desired electrochromic property to an electrochromic mirror.

BACKGROUND OF THE INVENTION

Glare is one of the troublesome factors when driving a vehicle. Many efforts have been made to solve the glaring problem. One of the most effective ways is to provide an electrochromic unit for the rearview mirror of the vehicle. The electrochromic unit deepens the color and thus reduces the reflectance of the mirror according to the degree of the glare, thereby minimizing the glaring effect. FIG. 1 is a schematic diagram showing a conventional electrochromic unit for use in a rearview mirror assembly of a vehicle to achieve the reflectance-adjustment purpose by changing the color of the rearview mirror.

The electrochromic unit includes two glass substrates 11 and 12 positioned parallel to each other, and spaced apart by a distance of a micrometer-to-millimeter order. On each of the inner faces of the glass substrates, a transparent indium-tin-oxide (ITO) coating 13, 14 is provided as an electrode for electric conduction. The space 15 between the two glass substrates 11 and 12 is filled with an electrochromic solution and sealed with a material 16 inert to the electrochromic solution, e.g. epoxy. Furthermore, a reflective layer 17 is coated on the other side of the glass substrate 14 opposite to the glass substrate 12 for providing proper mirror reflectance. By applying a voltage across the ITO cathode and anode 13 and 14, the color of the electrochromic solution will change accordingly. With the increase of the glare light intensity, the voltage applied to the electrochromic unit increases, and the color of the mirror becomes darker.

In general, the electrochromic solution includes an anodic compound which undergoes a reversible color change when its valence state is altered due to oxidation, a cathodic compound which undergoes a reversible color change when its valence state is altered due to reduction, and a solvent which solubilizes the anodic and cathodic compounds but keeps chemically inert to the other constituents of the electrochromic solution. The electrochromic solution may optionally further includes an electrolyte material for enhancing the conductivity of the electrochromic solution. Please refer to U.S. Pat. Nos. 4,902,108, 5,679,283, 5,611,966, 5,239,405, 5,500,760 and 6,211,994B1 which are incorporated herein for reference, to realize examples of the anodic compound, cathodic compound, solvent and electrolyte material contained in conventional electrochromic solutions.

In the prior art, the reflective layer 17 is generally made of aluminum. Due to poor adhesion between glass and aluminum, the reflective layer 17 is readily stripped off the glass substrate 12 so as to reduce lifetime of the rearview mirror assembly.

FIG. 2 is a schematic diagram showing another conventional electrochromic unit for use in a rearview mirror assembly of a vehicle to achieve the color-change purpose. The electrochromic unit of FIG. 2 includes two glass substrates 21 and 22 positioned parallel to each other, and spaced apart by a distance of a micrometer-to-millimeter order. On each of the inner faces of the glass substrates, an electrically conductive electrode 23, 24 is provided. The space 25 between the two glass substrates 21 and 22 is filled with an electrochromic solution and sealed with a material 26 inert to the electrochromic solution, e.g. epoxy. Depending on the required level of electric conduction, the electrode 23 is made of a transparent material such as indium-tin-oxide (ITO) or a transparent composite material such as ITO/metaL/ITO. The electrode 24 could also act as a reflective layer by utilizing a metallic material having both the high reflectivity and the high electrical conductivity. Thus, the process for fabricating the electrochromic unit can be exempted from making the reflective layer 17 in FIG. 1. The metallic material used in the electrode 24 is usually silver (Ag) or silver alloy such as silver-gold (Ag/Au) alloy, silver-platinum (Ag/Pt) alloy, silver-palladium (Ag/Pd) alloy and the like. However, since the electrode 24 is arranged between the glass substrate 22 and electrochromic solution 25 and in contact with the seal 26, the fabrication of the electrode 24 in view of the corrosion and the electrical property change problems are critical. For example, a base layer 27 between the electrode 24 and the glass substrate 22 is required for the purpose of attaching the electrode 24 onto the glass substrate 22. Furthermore, in order to prevent the electrode 24 from being corroded by the electrochromic solution 25, a protective layer 28 is further provided between the electrode 24 and the electrochromic solution 25 with a proviso that the electrical property of the electrode 24 is not impaired. Although the electrode 24 provides both the high reflectivity and the high electrical conductivity, the process for fabricating such electrochromic unit of FIG. 2 involves complicated steps and high producing cost.

SUMMARY OF THE INVENTION

It is an object of the present invention to provide a reflective layer which provides suitable reflectance for the mirror and excellent adhesion to the glass substrate of an electrochromic mirror assembly.

It is another object of the present invention to provide an electrochromic mirror which is easily produced and has an alternative color in response to the glare, compared to the conventional ones.

In accordance with an aspect of the present invention, there is provided an electrochromic mirror for performing color change in response to a voltage applied thereto. The electrochromic mirror comprises a first substrate, a second substrate, a first and a second electrodes, an electrochromic composition and a reflective layer. The first substrate being light transmissible. The second substrate is positioned substantially parallel to the first substrate, and spaced apart from the first substrate by a predetermined clearance to form a space therebetween. The first and the second electrodes are provided on opposite surfaces of the first and second substrates facing the space, respectively, for providing a voltage, the first electrode being light transmissible. The electrochromic composition is disposed in the space between the first and second substrates for performing color change in response to the voltage. The reflective layer is made of aluminum-titanium (Al/Ti) alloy and disposed on the second substrate for partially reflecting the light entering from the first substrate back to the first substrate.

In an embodiment, the first and the second substrates are made of glass.

In an embodiment, the first and the second electrodes are made of indium tin oxide (ITO).

In an embodiment, the reflective layer is disposed on the second substrate opposite to the second electrode. Furthermore, the electrochromic mirror comprises an intermediate layer between the second substrate and the reflective layer for cooperating with the reflective layer to provide different color from that resulting from only the reflective layer.

In an embodiment, the intermediate layer is made of indium tin oxide (ITO).

In an embodiment, the reflective layer is disposed between the second substrate and the second electrode.

In accordance with another aspect of the present invention, there is provide an electrochromic mirror for performing color change in response to a voltage applied thereto. The electrochromic mirror comprises a first substrate, a second substrate, a first and a second electrodes, an electrochromic composition and a composite reflective layer. The first substrate is light transmissible. The second substrate is positioned substantially parallel to the first substrate, and spaced apart from the first substrate by a predetermined clearance to form a space therebetween. The first and the second electrodes are provided on opposite surfaces of the first and second substrates facing the space, respectively, for providing a voltage, wherein the first electrode is light transmissible. The electrochromic composition is disposed in the space between the first and second substrates for performing color change in response to the voltage. The composite reflective layer is disposed on the second substrate for partially reflecting the light entering from the first substrate back to the first substrate. Preferably, the composite reflective layer is made of an indium tin oxide (ITO) layer and a highly reflective layer.

In an embodiment, the first and second substrates are made of glass.

In an embodiment, the first and the second electrodes are made of indium tin oxide (ITO).

In an embodiment, the highly reflective layer is made of a material selected from a group consisting of chromium (Cr), aluminum-titanium (Al/Ti) alloy and silver (Ag).

In an embodiment, the composite reflective layer is disposed on the second substrate opposite to the second electrode.

In an embodiment, the indium tin oxide (ITO) layer of the composite reflective layer is disposed between the second substrate and the highly reflective layer.

In accordance with another aspect of the present invention, there is provided an electrochromic mirror for performing color change in response to a voltage applied thereto. The electrochromic mirror comprises a first substrate, a second substrate, a light-transmissible electrode, a composite electrode and an electrochromic composition. The first substrate is light transmissible. The second substrate is positioned substantially parallel to the first substrate, and spaced apart from the first substrate by a predetermined clearance to form a space therebetween. The light-transmissible electrode is disposed on the first substrate facing the space. The composite electrode is made of an indium tin oxide (ITO) layer and a highly reflective layer and disposed on the second substrate facing the space for cooperating with the light-transmissible electrode to provide a voltage. The electrochromic composition is disposed in the space between the light-transmissible electrode and the composite electrode for performing color change in response to the voltage.

In an embodiment, the highly reflective layer is made of a material selected from a group consisting of chromium (Cr), aluminum-titanium (Al/Ti) alloy and silver (Ag).

In an embodiment, the highly reflective layer is disposed between the second substrate and the indium tin oxide (ITO) layer of the composite reflective layer.

In accordance with another aspect of the present invention, there is provided a reflective layer of an electrochromic mirror for partially reflecting incident light from an image. The reflective layer comprises an aluminum-titanium (Al/Ti) alloy layer. In an embodiment, the reflective layer further comprises an indium tin oxide (ITO) attached to the aluminum-titanium (Al/Ti) alloy layer.

In accordance with another aspect of the present invention, there is provided a reflective layer of an electrochromic mirror for partially reflecting incident light from an image. The reflective layer comprises is immediately adjacent indium tin oxide (ITO) layer and highly reflective layer. In an embodiment, the highly reflective layer is made of a material selected from a group consisting of chromium (Cr), aluminum-titanium (Al/Ti) alloy and silver (Ag).

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

In accordance to a first preferred embodiment of the present invention, an electrochromic mirror comprises two supporting substrates positioned parallel to each other, and spaced apart by a distance of a micrometer-to-millimeter order. On each of the inner faces of the substrates, an electrode is provided for electric conduction. The space between the two glass substrates is filled with an electrochromic solution and sealed with a material inert to the electrochromic solution. Furthermore, a reflective layer is provided behind the rear substrate for proper mirror reflectance. By applying a voltage across the electrodes, the color of the electrochromic solution will change accordingly. With the increase of the glare light intensity, the voltage applied to the electrochromic unit increases, and the color of the mirror becomes darker. Each of the supporting substrates is a soda-lime glass with a $SiO_2$-dip coat layer or a $SiO_2$—H coat layer, and has thickness of about 0.9~2.3 mm. Each of the electrodes is an indium-tin-oxide (ITO) electrode having thickness of about 1000~3000Å and electrical resistance of 3~35 ohms. The seal is made of epoxy and has thickness of about 80~150 mm. The reflective layer is made of aluminum-titanium (Al/Ti) alloy and has thickness of about 100~250 nm. The electrochromic solution filling the space consists of propylene carbonate (70% v/v), ethyl methyl carbonate (30% v/v), 0.02M 1,1'-bis(2-nitrophenyl)-4,4'-dipyridinium bis(tetrafluoroborate), 0.02M ferrocenemethylketone-N,N-diphenylhydrazone and 2%

(w/v) polymethylmethacrylate (PMMA). An example is given as follows.

EXAMPLE 1

Figure 1:
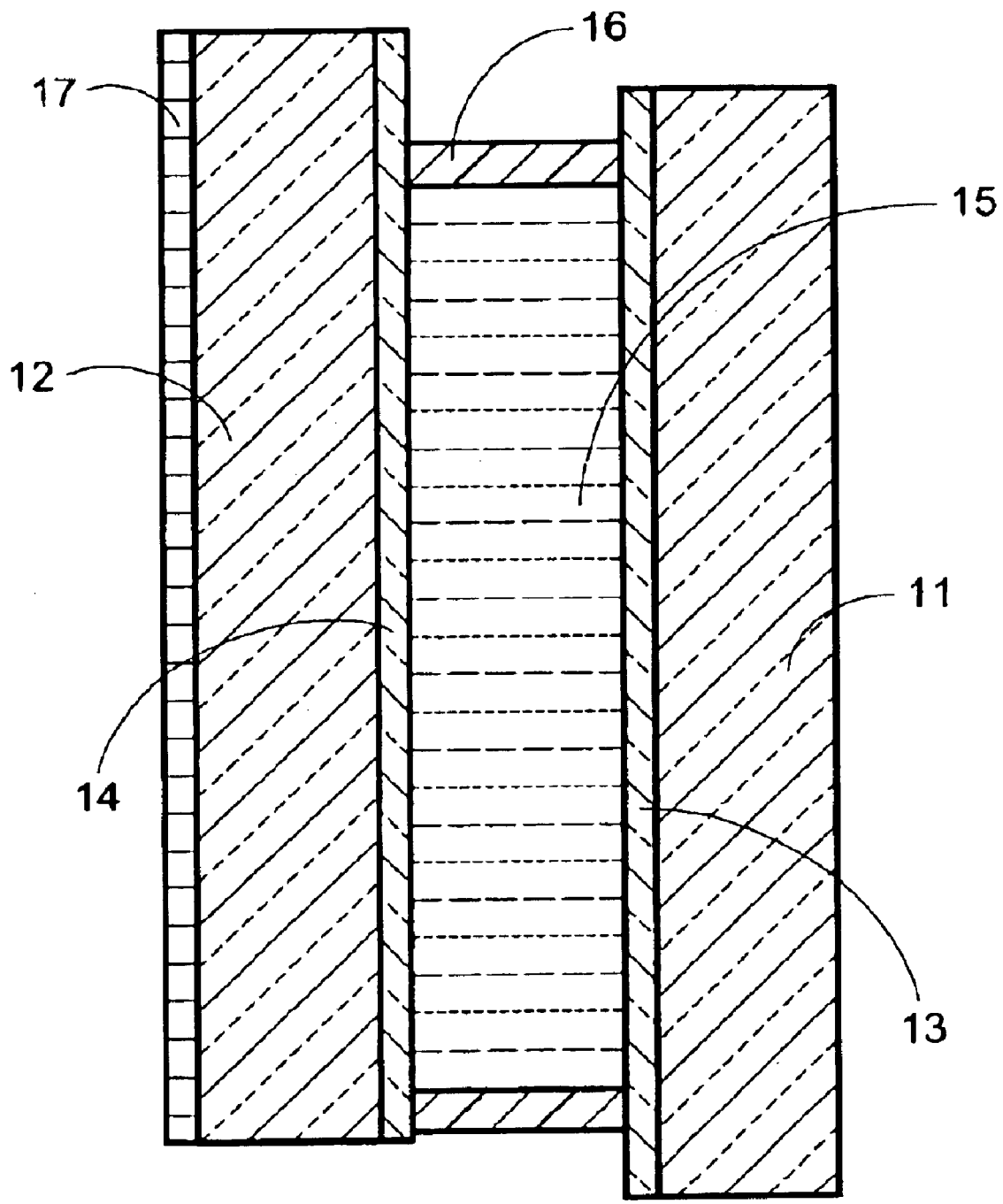
FIG. 1 is a schematic diagram showing a conventional electrochromic unit for use in a rearview mirror assembly.
Figure 2:
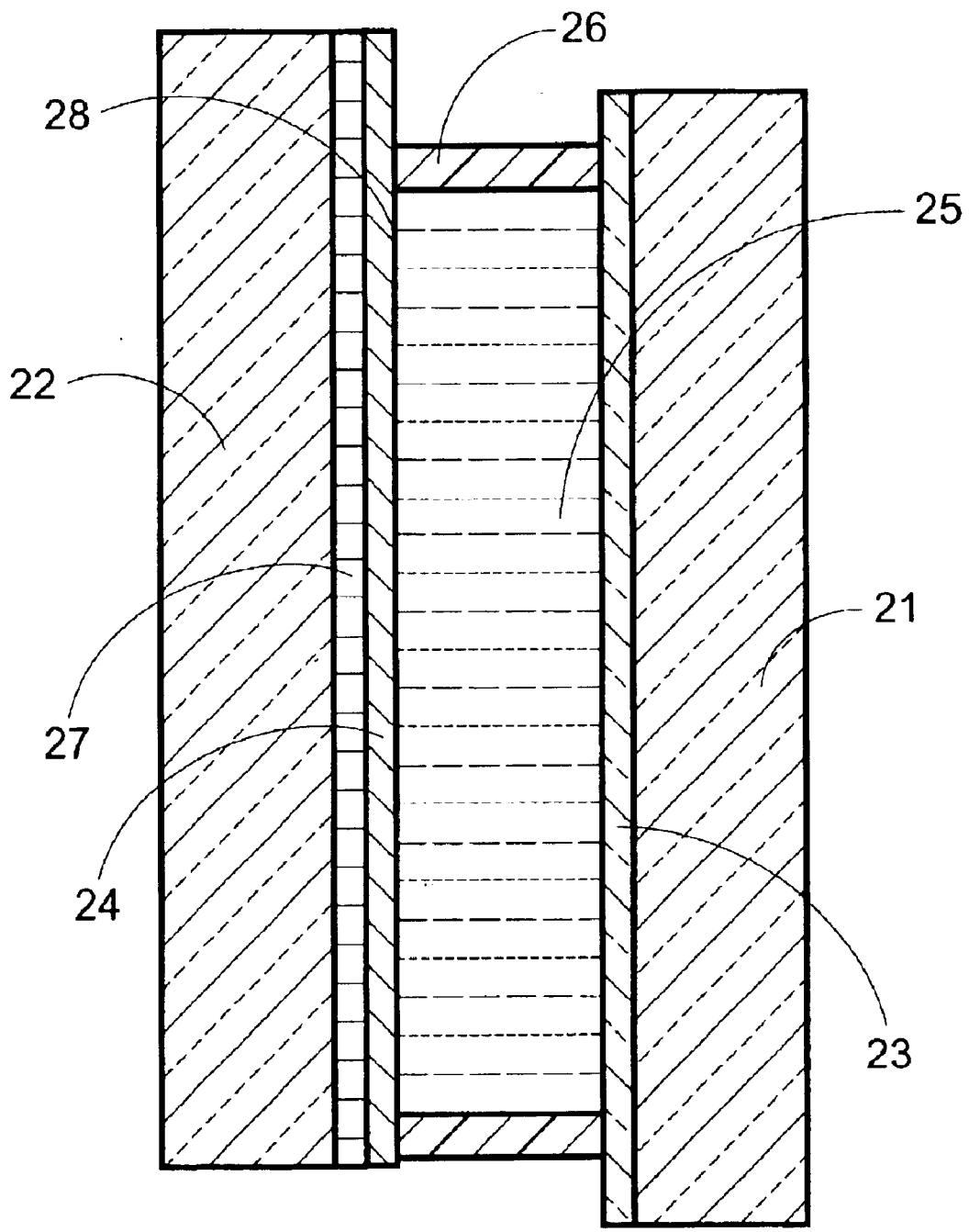
FIG. 2 is a schematic diagram showing another conventional electrochromic unit for use in a rearview mirror assembly.

A structure of an exemplified electrochromic mirror according to the present invention is described with reference to FIG. 1. Each glass substrate 11, 12 has thickness of 2.0 mm, each ITO electrode 13, 14 has thickness of 1500 Å and electrical resistance of 6 ohms, and the epoxy seal 16 has thickness of 100 mm. The reflective layer 17 consists of 70% by weight of aluminum and 30% by weight of titanium and has thickness of about 150 nm. Optionally, a protective layer (not shown) made of silicon, titanium or indium oxide and having thickness of 200 Å is provided on the back of the reflective layer 17. When no voltage is applied, the reflectance of the electrochromic mirror is approximately 70%. Whereas, by applying a voltage of 1.5 volts, the mirror surface changes to a deep blue color within 1 second and the reflectance of the electrochromic mirror is reduced to approximately 9%, thereby minimizing the glaring effect. This electrochromic mirror can be cycled more than 200,000 times.

In accordance to a second preferred embodiment of the present invention, an electrochromic mirror comprises two supporting substrates positioned parallel to each other, and spaced apart by a distance of a micrometer-to-millimeter order. On each of the inner faces of the substrates, an electrode is provided for electric conduction. The space between the two glass substrates is filled with an electrochromic solution and sealed with a material inert to the electrochromic solution. Furthermore, a reflective layer is provided between the rear electrode and the rear substrate for proper mirror reflectance. By applying a voltage across the electrodes, the color of the electrochromic solution will change accordingly. With the increase of the glare light intensity, the voltage applied to the electrochromic unit increases, and the color of the mirror becomes darker. Each of the two glass substrates is a soda-lime glass with a $SiO_2$-dip coat layer or a $SiO_2$—H coat layer, and has thickness of about 0.9~2.3 mm. The first electrode is made of indium-tin-oxide (ITO), and has thickness of about 1000~3000 Å and electrical resistance of 3~35 ohms. The second electrode is a composite electrode comprising an indium tin oxide (ITO) layer and a highly reflective layer, and disposed on the glass substrate facing the space for cooperating with the light-transmissible electrode to provide a voltage. The indium tin oxide (ITO) layer has thickness of about 1000~3000 Å and electrical resistance of 3~35 ohms. The highly reflective layer is made of a metallic material such as chromium (Cr), aluminum-titanium (Al/Ti) alloy, silver (Ag) or a combination thereof, and has thickness of about 100~250 nm and electrical resistance of 1~8 ohms. The seal is made of epoxy and has thickness of about 80~150 mm. The electrochromic solution filling the space consists of propylene carbonate (70% v/v), ethyl methyl carbonate (30% v/v), 0.02M 1,1'-bis(2-nitrophenyl)-4,4'-dipyridinium bis(tetrafluoroborate), 0.02M ferrocenemethylketone-N,N-diphenylhydrazone and 2% (w/v) polymethylmethacrylate (PMMA). Examples are given as follows.

EXAMPLE 2

Figure 3:
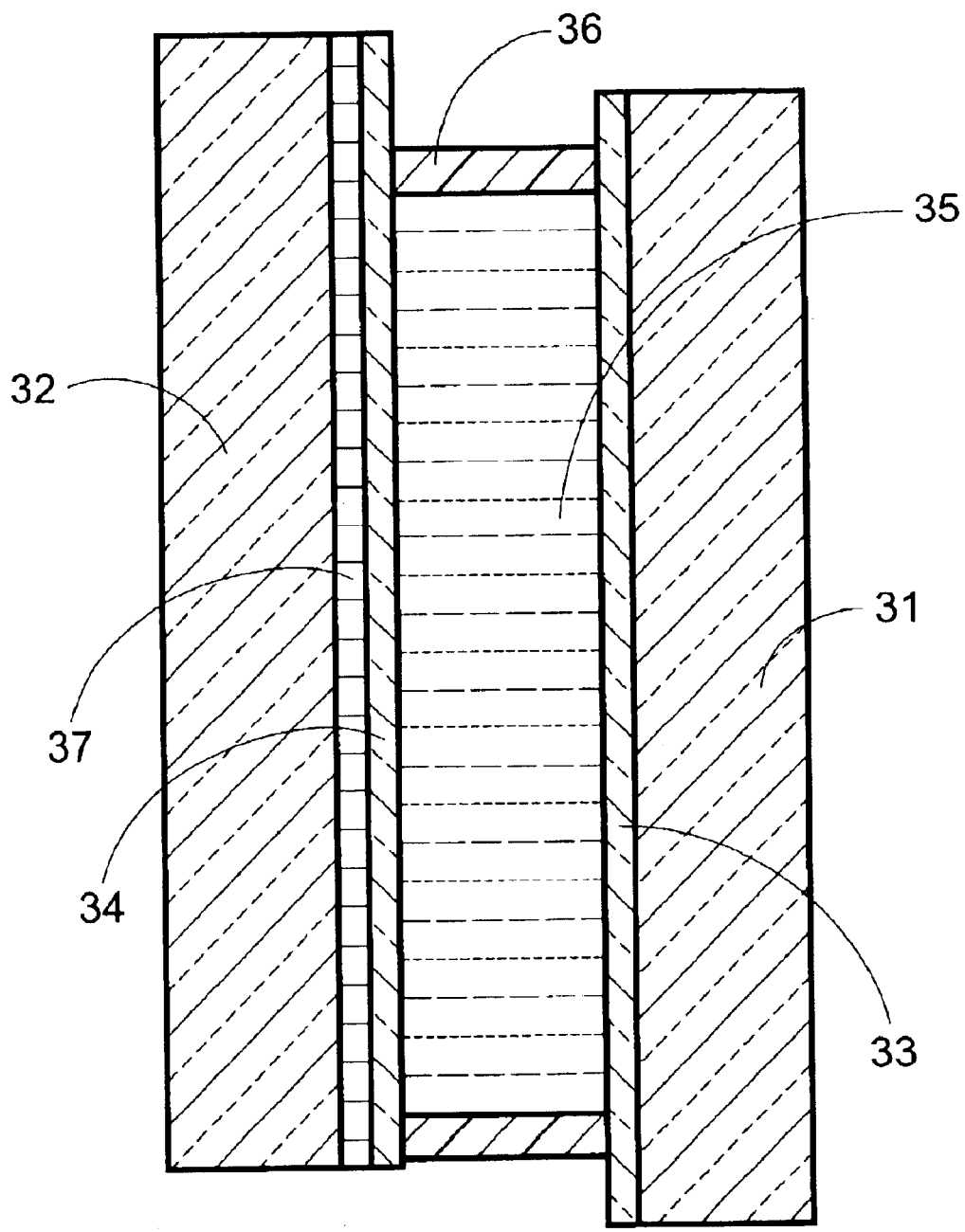
FIG. 3 is a schematic diagram showing an electrochromic unit for use in a rearview mirror assembly according to a preferred embodiment of the present invention.

A structure of an electrochromic mirror according to the present invention is described with reference to FIG. 3. Each glass substrate 31, 32 has thickness of 1.3 mm, the ITO electrode 33 has thickness of 1500 Å and electrical resistance of 6 ohms. The indium tin oxide (ITO) layer 34 of the composite electrode has thickness of 1500 Å and electrical resistance of 6 ohms, and the highly reflective layer 37 consists of 70% by weight of aluminum and 30% by weight of titanium and has thickness of about 150 nm. The epoxy seal 36 has thickness of about 150 mm. When no voltage is applied, the electrochromic mirror has a reflectance of approximately 79% and appears pale golden. Whereas, by applying a voltage of 1.5 volts across the electrodes 33 and 34, the mirror surface changes to a deep blue color within 1 second and the reflectance of the electrochromic mirror is reduced to approximately 12%, thereby minimizing the glaring effect. The electrochromic mirror can be cycled more than 2,000 times.

EXAMPLE 3

A structure of an electrochromic mirror according to the present invention is described with reference to FIG. 3. Each glass substrate 31, 32 has thickness of 1.3 mm, the ITO electrode 33 has thickness of 1500 Å and electrical resistance of 6 ohms. The indium tin oxide (ITO) layer 34 of the composite electrode has thickness of 1500 Å and electrical resistance of 6 ohms, and the highly reflective layer 37 is made of silver and has thickness of about 150 nm. The epoxy seal 36 for sealing the electrochromic solution 35 from leakage has thickness of about 150 mm. When no voltage is applied, the electrochromic mirror has a reflectance of approximately 82% and appears a bright silver color. Whereas, by applying a voltage of 1.5 volts across the electrodes 33 and 34, the mirror surface changes to a deep blue color within 1 second and the relectance of the electrochromic mirror is reduced to approximately 12%, thereby minimizing the glaring effect. The electrochromic mirror can be cycled more than 2,000 times.

EXAMPLE 4

A structure of an electrochromic mirror according to the present invention is described with reference to FIG. 3. Each glass substrate 31, 32 has thickness of 1.3 mm, the ITO electrode 33 has thickness of 1500 Å and electrical resistance of 6 ohms. The indium tin oxide (ITO) layer 34 of the composite electrode has thickness of 1500 Å and electrical resistance of 6 ohms, and the highly reflective layer 37 is made of chromium and has thickness of about 150 nm. The epoxy seal 36 has thickness of about 150 mm. When no voltage is applied, the electrochromic mirror has a reflectance of approximately 45% and appears a pale silver-blue color. Whereas, by applying a voltage of 1.5 volts across the electrodes 33 and 34, the mirror surface changes to a deep blue color within 1 second and the reflectance of the electrochromic mirror is reduced to approximately 9%, thereby minimizing the glaring effect. The electrochromic mirror can be cycled more than 100,000 times.

EXAMPLE 5

A structure of an electrochromic mirror according to the present invention is described with reference to FIG. 3. Each glass substrate 31, 32 has thickness of 1.3 mm, the ITO electrode 33 has thickness of 1500 Å and electrical resistance of 6 ohms. The indium tin oxide (ITO) layer 34 of the composite electrode has thickness of 1500 Å and electrical resistance of 15 ohms, and the highly reflective layer 37 is made of chromium and has thickness of about 150 nm. The epoxy seal 36 has thickness of about 150 mm. When no voltage is applied, the electrochromic mirror has a reflectance of approximately 41% and appears pale blue.

Whereas, by applying a voltage of 1.5 volts across the electrodes 33 and 34, the mirror surface changes to a deep blue color within 2 seconds and the reflectance of the electrochromic mirror is reduced to approximately 6%, thereby minimizing the glaring effect. The electrochromic mirror can be cycled more than 20,000 times.

In accordance to a third preferred embodiment of the present invention, an electrochromic mirror comprises two supporting substrates positioned parallel to each other, and spaced apart by a distance of a micrometer-to-millimeter order. On each of the inner faces of the substrates, an electrode is provided for electric conduction. The space between the two glass substrates is filled with an electrochromic solution and sealed with a material inert to the electrochromic solution. Furthermore, a reflective layer is provided behind the rear substrate for proper mirror reflectance. By applying a voltage across the electrodes, the color of the electrochromic solution will change accordingly. With the increase of the glare light intensity, the voltage applied to the electrochromic unit increases, and the color of the mirror becomes darker. Each of the glass substrates is a soda-lime glass with a $SiO_2$-dip coat layer or a $SiO_2$—H coat layer, and has thickness of about 0.9~2.3 mm. Each of the indium-tin-oxide (ITO) electrodes has thickness of about 1000~3000 and electrical resistance of 3~35 ohms. The reflective layer is a composite reflective layer disposed on the rear glass substrate for partially reflecting the light entering from the front substrate back to the front substrate, and comprises a highly reflective layer and an intermediate layer. The highly reflective layer is made of a metallic material such as chromium (Cr), aluminum-titanium (Al/Ti) alloy, silver (Ag) or a combination thereof, and has thickness of about 100~250 nm and electrical resistance of 1~8 ohms. The intermediate layer is an indium tin oxide (ITO) layer having thickness of about 1000~3000 Å and electrical resistance of 3~35 ohms. The presence of the intermediate ITO layer provides different color from that resulting from only the highly reflective layer. The seal is made of epoxy and has thickness of about 80~150 mm. The electrochromic solution filling the space consists of propylene carbonate (70% v/v), ethyl methyl carbonate (30% v/v), 0.02M 1,1'-bis(2-nitrophenyl)-4,4'-dipyridinium bis(tetrafluoroborate), 0.02M ferrocenemethylketone-N,N-diphenylhydrazone and 2% (w/v) polymethylmethacrylate (PMMA). An example is given as follows.

EXAMPLE 6

Figure 4:
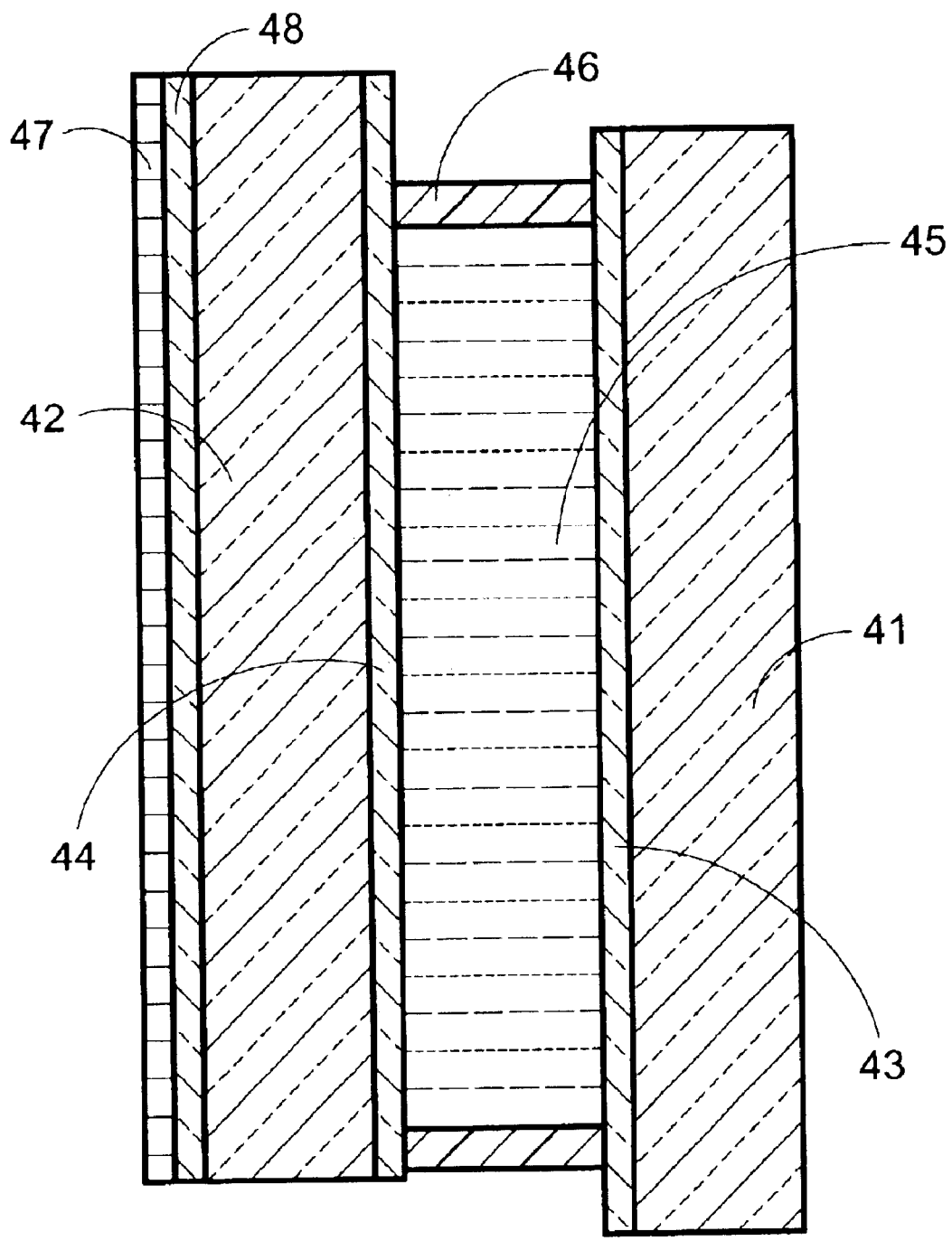
FIG. 4 is a schematic diagram showing an electrochromic unit for use in a rearview mirror assembly according to another preferred embodiment of the present invention.

A structure of an electrochromic mirror according to the present invention is described with reference to FIG. 4. Each glass substrate 41, 42 has thickness of 2.0 mm. Each ITO electrode 43, 44 has thickness of 1300 Å and electrical resistance of 6 ohms. The indium tin oxide (ITO) layer 48 of the composite reflective layer has thickness of 1300 Å and electrical resistance of 6 ohms, and the highly reflective layer 47 is an aluminum-titanium (Al/Ti) alloy consisting of 70% by weight of aluminum and 30% by weight of titanium and has thickness of about 150 nm. In addition, a protective layer (not shown) made of silicon, titanium or indium oxide and having thickness of 200 Å is provided on the back of highly reflective layer 47. The epoxy seal 46 for sealing the electrochromic solution 45 from leakage has thickness of about 150 mm. When no voltage is applied, the electrochromic mirror has a reflectance of approximately 68% and appears pale golden. Whereas, by applying a voltage of 1.5 volts across the electrodes 43 and 44, the mirror surface changes to a deep blue color within 1 second and the reflectance of the electrochromic mirror is reduced to approximately 9%, thereby minimizing the glaring effect. The electrochromic mirror can be cycled more than 200,000 times.

From the above examples, it is understood that the reflective layer of the present invention could provide suitable reflectance for the electrochromic mirror so as to minimize the glaring effect, and has excellent adhesion to the glass substrate of an electrochromic mirror assembly, when compared to the conventional ones. In addition, the reflective layer of the present invention could impart an alternative color and desired electrochromic property to the electrochromic mirror. Moreover, since no procedure to form the base layer 27 and/or the protective layer 28 described in FIG. 1 is critically required, the electrochromic mirror of the present invention is easily produced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electrochromic mirror for performing color change in response to a voltage applied thereto, comprising:
   a first substrate being light transmissible;
   a second substrate positioned substantially parallel to said first substrate, and spaced apart from said first substrate by a predetermined clearance to form a space therebetween;
   a first and a second electrodes provided on opposite surfaces of said first and second substrates facing said space, respectively, for providing a voltage, said first electrode being light transmissible;
   an electrochromic composition disposed in said space between said first and second substrates for performing color change in response to said voltage; and
   a reflective layer made of aluminum-titanium (Al/Ti) alloy and disposed on said second substrate opposite to said second electrode for partially reflecting the light entering from said first substrate back to said first substrate.

2. The electrochromic mirror according to claim 1 wherein said first and second substrates are made of glass.

3. The electrochromic mirror according to claim 1 wherein said first and said second electrodes are made of indium tin oxide (ITO).

4. The electrochromic mirror according to claim 1 further comprising an intermediate layer between said second substrate and said reflective layer for cooperating with said reflective layer to provide different color from that resulting from only said reflective layer.

5. The electrochromic mirror according to claim 4 wherein said intermediate layer is made of indium tin oxide (ITO).

6. The electrochromic mirror according to claim 1 wherein said reflective layer is disposed between said second substrate and said second electrode.

7. An electrochromic mirror for performing color change in response to a voltage applied thereto, comprising:
   a first substrate being light transmissible;
   a second substrate positioned substantially parallel to said first substrate, and spaced apart from said first substrate by a predetermined clearance to form a space therebetween;

first and second electrodes provided on opposite surfaces of said first and second substrates facing said space, respectively, for providing a voltage, said first electrode being light transmissible;

an electrochromic composition disposed in said space between said first and second substrates for performing color change in response to said voltage; and a composite reflective layer disposed on said second substrate opposite to said second electrode for partially reflecting the light entering from said first substrate back to said first substrate, wherein said composite reflective layer comprises a highly reflective layer and an intermediate layer between said second substrate and said reflective layer for cooperating with said reflective layer to provide different color from that resulting from only said reflective layer.

8. The electrochromic mirror according to claim 7 wherein said first and second substrates are made of glass.

9. The electrochromic mirror according to claim 7 wherein said first and said second electrodes are made of indium tin oxide (ITO).

10. The electrochromic mirror according to claim 7 wherein said highly reflective layer is made of a material selected from a group consisting of chromium (Cr), aluminum-titanium (Al/Ti) alloy and silver (Ag).

11. The electrochromic mirror according to claim 10 wherein said intermediate layer is an indium tin oxide (ITO) layer and is disposed between said second substrate and said highly reflective layer.

* * * * *